United States Patent
Finkelstein et al.

(10) Patent No.: US 9,524,336 B1
(45) Date of Patent: Dec. 20, 2016

(54) SEARCH QUERY AUTO-COMPLETIONS BASED ON SOCIAL GRAPH

(71) Applicant: Google Inc., Mountain View, CA (US)

(72) Inventors: Lev Finkelstein, Netanya (IL); Yosi Markovich, Haifa (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/054,823

(22) Filed: Feb. 26, 2016

Related U.S. Application Data

(63) Continuation of application No. 13/571,938, filed on Aug. 10, 2012, now Pat. No. 9,305,092.

(51) Int. Cl.
*G06F 17/30* (2006.01)

(52) U.S. Cl.
CPC ..... *G06F 17/3064* (2013.01); *G06F 17/30675* (2013.01); *G06F 17/30696* (2013.01); *G06F 17/30864* (2013.01); *G06F 17/30867* (2013.01); *G06F 17/30958* (2013.01)

(58) Field of Classification Search
CPC ............... G06F 17/30864; G06F 17/30867
USPC .......................................................... 707/723
See application file for complete search history.

(56) References Cited

U.S. PATENT DOCUMENTS

| | | | |
|---|---|---|---|
| 8,498,574 B2 | 7/2013 | Beninghaus et al. | |
| 8,843,491 B1 * | 9/2014 | Mazniker | G06F 17/30867 707/737 |
| 8,930,351 B1 | 1/2015 | Kim et al. | |
| 9,177,065 B1 * | 11/2015 | Ben-Yair | G06Q 50/01 |
| 9,305,092 B1 * | 4/2016 | Finkelstein | G06F 17/3097 |
| 2007/0050352 A1 * | 3/2007 | Kim | G06F 17/2223 |
| 2010/0005061 A1 * | 1/2010 | Basco | G06F 17/3071 704/9 |
| 2010/0005087 A1 * | 1/2010 | Basco | G06F 17/30867 707/E17.017 |
| 2012/0110096 A1 * | 5/2012 | Smarr | G06Q 10/10 709/206 |
| 2012/0150979 A1 * | 6/2012 | Monaco | G06Q 10/107 709/206 |
| 2013/0191416 A1 * | 7/2013 | Lee | G06F 17/30979 707/771 |
| 2013/0218866 A1 * | 8/2013 | Qian | G06F 17/30696 707/714 |
| 2013/0254155 A1 * | 9/2013 | Thollot | G06F 17/30528 707/602 |
| 2014/0025702 A1 * | 1/2014 | Curtiss | G06Q 50/01 707/769 |

* cited by examiner

*Primary Examiner* — Mark E Hershley
(74) *Attorney, Agent, or Firm* — Fish & Richardson P.C.

(57) ABSTRACT

In general, aspects of the subject matter described in this specification can be embodied in methods that include the actions of receiving a search query initial input from a user, receiving a plurality of query auto-completions based on the search query initial input, receiving social graph data, the social graph data being specific to the user, for each query auto-completion of the plurality of query auto-completions, determining a ranking score, the ranking score being determined at least partially based on the social graph data, and transmitting instructions to display the plurality of query auto-completions to the user in a rank order that is determined based on ranking scores.

22 Claims, 3 Drawing Sheets

SEARCH QUERY AUTO-COMPLETIONS BASED ON SOCIAL GRAPH

CROSS-REFERENCE TO RELATED APPLICATIONS

This application is a continuation of U.S. application Ser. No. 13/571,938, filed Aug. 10, 2012, the disclosure of which is expressly incorporated herein by reference in its entirety.

BACKGROUND

The present disclosure relates to searching.

Internet search engines provide information about Internet accessible resources (e.g., Web pages, images, text documents, and multimedia content) that are responsive to a user's search query by returning a set of search results in response to the query. A search result may include, for example, a Uniform Resource Identifier (URI) and a snippet of information for resources responsive to a query.

Some Internet search engines provide query auto-completions as a user is entering a query. These query auto-completions generally correspond to possible completions and/or possible matches to the user's input. For example, if a user types "formic acid prop," a search engine may suggest the query completion "formic acid properties" and/or the query match "properties of formic acid." These query auto-completions can be presented, for example, in a drop down box that lists the query auto-completions.

SUMMARY

In general, one aspect of the subject matter described in this specification can be embodied in methods that include the actions of receiving a search query initial input from a user, receiving a plurality of query auto-completions based on the search query initial input, receiving social graph data, the social graph data being specific to the user, for each query auto-completion of the plurality of query auto-completions, determining a ranking score, the ranking score being determined at least partially based on the social graph data, and transmitting instructions to display the plurality of query auto-completions to the user in a rank order that is determined based on ranking scores. Other implementations of this aspect include corresponding systems, apparatus, and computer program products.

These and other implementations can optionally include one or more of the following features: each ranking score is determined based on at least one of a frequency, an interaction score, an endorsement score and a selection score that are specific to a respective query auto-completion; one or more of the frequency, the interaction score, the endorsement score and the selection score is determined based on the social graph data; the frequency reflects a frequency at which the respective query auto-completion is used as a search query, the interaction score reflects user interaction with search results that had been previously generated based on the respective query auto-completion, the endorsement score reflects endorsements users have provided to search results that had been previously generated based on the respective query auto-completion, and the selection score reflects selections of the respective query auto-completion as a search query from a list of query auto-completions; each ranking score is further determined based on respective weights applied to the at least one of the frequency, the interaction score, the endorsement score and the selection score; the plurality of query auto-completions are received from a query auto-completion index that provides a collection of queries received from one or more users of a search service; actions further include receiving a selection of a query auto-completion of the plurality of query auto-completions and, in response, retrieving one or more search results that are responsive to the query auto-completion; actions further include identifying the query auto-completion as a highest ranking query auto-completion, wherein the selection is an automatic selection in response to the query auto-completion being the highest ranking query auto-completion, and transmitting instructions to display the search results as preliminary search results; the preliminary search results are displayed concurrently with the plurality of query auto-completions; transmitting ancillary data and instructions to display the ancillary data with the plurality of query auto-completions; the ancillary data includes one or more endorsement counts, each endorsement count being specific to a query auto-completion; and actions further include: receiving user input, the user input indicating interaction of the user with an endorsement count, and in response to receiving the user input, transmitting instructions to display social contact information, the social contact information indicating one or more members of a social graph of the user that have generated endorsements.

The details of one or more implementations of the present disclosure are set forth in the accompanying drawings and the description below. Other features, aspects, and advantages of the present disclosure will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to providing query auto-completions based on initial input provided by a user and a social graph of the user. More particularly, one or more query auto-completions can be provided to the user for selection and can be determined based on an initial input by the user and respective ranking scores that can be determined based on the social graph of the user. In some implementations, a plurality of query auto-completions can be identified based on the initial input, the initial input including an n-gram of characters input by the user. In some implementations, the query auto-completions are identified from an index of query auto-completions that is associated with queries submitted by users of a search service. Each query auto-completion can include an associated ranking score. In some examples, the ranking score is at least partially determined based on the social graph of the user. In some implementations, a rank order of query auto-completions is determined based on the ranking scores and query auto-completions are displayed to the user in the rank order.

Accordingly, implementations of the present disclosure assist the user in formulating search queries. More particularly, query formulation can be a difficult task, as users may be unsure of which terms to include in a search query.

Consequently, search queries can be short, resulting in search results that might not be particularly relevant to the searching user. As discussed herein, implementations of the present disclosure provide social-based assistance to the user in formulating search queries based on social relationships of the user with other users of the search service. In this manner, relevant search queries can be suggested to the user that can be used to enhance the relevancy of the search results displayed to the user.

Figure 1:
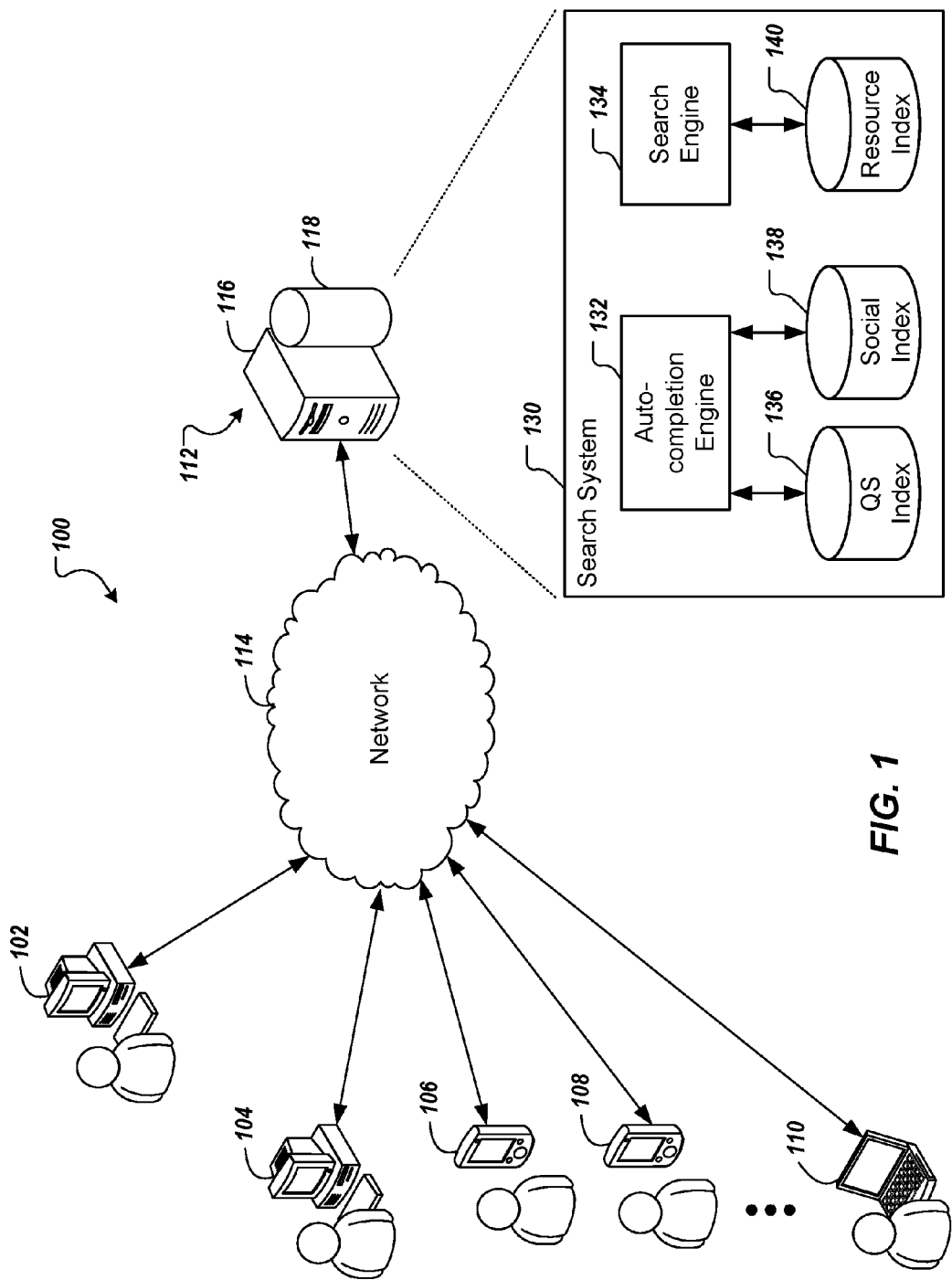
FIG. 1 is a diagram of an example network architecture.

FIG. 1 is a diagram of an example network architecture 100. The network architecture 100 includes a number of client devices 102-110 communicably connected to a server system 112 by a network 114. The server system 112 includes a processing device 116 and a data store 118. The processing device 116 executes computer instructions (e.g., resource search program code) stored in the data store 118 to perform the functions of one or more computer-implemented services (e.g., a search service).

In some implementations, the client devices 102-110 can be provided as computing devices such as laptop or desktop computers, smartphones, personal digital assistants, portable media players, tablet computers, or other appropriate computing devices. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Users of the client devices 102-110 can access the one or more computer-implemented services provided by the server system 112 and/or other server systems (not shown). Example computer-implemented services can include search services, electronic message services, instant messaging (chat) services, social networking service, blogging services, digital content sharing services. In some examples, users of the client devices 102-110 can be contacts of one another in one or more of the computer-implemented services. Consequently, each user can be associated with a user-specific social graph, discussed in further detail herein, that is at least partially defined based on user interaction through the computer-implemented services.

In some examples, the server system 112 can host a search service provided by a search system 130. In some examples, the search system 130, and components thereof, can be provided as one or more computer programs that can be executed using one or more processors. In the depicted example, the search system 130 includes a query auto-completion engine 132, a search engine 134, a query auto-completion (QS) index 136, a social index 138 and a resource index 140. In some examples, one or more components can be combined. For example, the search engine 134 can include the query auto-completion engine 132, the query auto-completion (QS) index 136, the social index 138 and/or the resource index 140.

In some implementations, the query auto-completion engine 132 can process an initial search query input provided by a searching user to identify one or more query auto-completions and to provide at least one of the one or more query auto-completions for display to the user, as discussed in further detail herein. In some examples, the query auto-completion engine 132 retrieves information from the query auto-completion index 136 and the social index 138. In some examples, the query auto-completion index 136 includes a plurality of query auto-completions that might be responsive to one or more initial inputs received at the search system 130.

In some implementations, the query auto-completion index 136 includes queries that are provided as search queries by one or more users of the search service, each of the one or more users having a computer-based social relationship (e.g., a social affinity) with one or more other users of the search service. In this manner, the query auto-completion index 136 provides a body of queries that can be accessed based on an identifier associated with the searching user and a social graph associated with the searching user. In some examples, the query auto-completions provided in the query auto-completion index 136 can be updated relatively frequently. In some examples, the query auto-completion index 136 can be updated in response to a threshold number of queries being received and/or after a threshold time has lapsed since being last updated. For example, because the query auto-completions are provided based on search queries that users submit to the search system, query auto-completions can be frequently added to the query auto-completion index 136 and a social relevance of each query auto-completion to the searching user can be dynamic. This stands in contrast to other indices that may be relatively static in the short-term.

In some examples, the query auto-completion engine 132 generates one or more auto-completions on-the-fly, based on processing of the initial search query input. In some examples, the social index 138 includes social graph information that might be relevant to users submitting one or more initial inputs.

In some implementations, the search engine 134 can process an initial input and/or a search query to generate relevant search results. In some examples, the search results include representations of and hyperlinks to one or more resources that are available over the network 114. Example resources can include web pages, images, videos, files and/or any other appropriate digital content available over the network 114. In some examples, the resource index 140 includes information regarding resources that are available over the network 114 and a Uniform Resource Identifier (URI) (e.g., a Uniform Resource Locator (URL)) associated with each resource. In some examples, search results responsive to the initial input and/or the search query can be provided for display to searching users and can include information provided from the resource index 140.

In accordance with implementations of the present disclosure, one or more query auto-completions can be provided to a searching user of a computer-implemented search service, at least one of the one or more query auto-completions being provided based on a social graph of the searching user. In some examples, the user can provide an initial search query input to the search service, the initial input being provided as a sequence of characters. The search service can identify one or more query auto-completions based on the initial input and the social graph of the user. In some examples, a plurality of query auto-completions are identified based on the initial input. For each query auto-completion, a ranking score is provided. The ranking score can be at least partially based on a social graph of the user. In some implementations, a rank order of query auto-completions is determined based on the ranking scores. Query auto-completions are displayed to the user in the rank order. In some examples, preview search results can be generated based on the highest ranking query auto-completion and can be displayed to the user.

As noted above, the ranking score for a query auto-completion can be at least partially based on the social graph of the user. As used in this specification, a social graph can refer to a single social graph or multiple interconnected social graphs. Distinct social graphs can be generated for different types of connections a user has. For example, a user can be connected with chat contacts in one social graph, electronic messaging contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can then be used to identify additional connections based on that person's connections. The distinct social graphs can include edges connecting one or more social graph to one or more other social graphs.

Types of connections and social graphs can include, but are not limited to other users in which the user is in direct contact (e.g., user mail or chat contact, direct contacts on social sites) and users in which the user is in indirect contact (e.g., friends of friends, connections of users that have a direct connection to the user). In some implementations, the social graph includes content generated by individuals (e.g., blog posts, reviews) as connections to the user. The social graph can include connections within a single network or across multiple networks (separable or integrated). Public social graph relationships can also be considered. In some examples, public relationships can be established through public profiles and/or public social networking services.

A social graph of a user can be provided as a collection of connections (e.g., users, resources) identified as having a relationship to the user within a specified degree of separation. The user's social graph can include people and particular content at different degrees of separation. For example, the social graph of a user can include contacts, contacts of contacts (e.g., as defined by a user, social graphing site, or other metric), the user's social circle, people followed by the user (e.g., subscribed blogs, feeds, or web sites), co-workers, and other specifically identified content of interest to the user (e.g., particular web sites).

Example connections extend a user's social graph to people and content both within a system and across one or more external networks and can be provided at different degrees of separation. For example, a user can have a profile or contacts list that includes a set of identified friends, a set of links to external resources (e.g., web pages), and subscriptions to content of the system (e.g., a system that provides various content and applications including electronic messaging, chat, video, photo albums, feeds, or blogs). Each of these groups can be connected to other users or resources at another degree of separation from the user. For example, the friends of the user each have their own profile that includes links to resources as well as friends of the respective friends. The connections to a user within a specified number of degrees of separation can be considered the social graph of the user. In some implementations, the number of degrees of separation used in determining the user's social graph can be specified by the user. In some implementations, a default number of degrees of separation is used. Moreover, a dynamic number of degrees of separation can be used that is based on, for example, the type of connection.

In some implementations, the membership and degree of separation in the social graph is based on other factors, including a frequency of interaction. For example, a frequency of interaction by the user (e.g., how often the user visits a particular social networking site) or type of interaction (e.g., endorsing or selecting items associated with friends). As interaction changes, the relationship of a particular contact in the social graph can also dynamically change. Thus, the social graph can be dynamic rather than static.

In some implementations, social signals can be layered over the social graph (e.g., using weighted edges or other weights between connections in the social graph). These signals, for example, frequency of interaction or type of interaction between the user and a particular connection, can then be used to weight particular connections in the social graph or social graphs without modifying the actual social graph connections. These weights can change as the interaction with the user changes. In some examples, the weight of a particular connection can reflect a social affinity between members in the social graph. For example, a higher weight between members can reflect a closer social affinity between the members than a lower weight.

In some implementations, social graphs can be stored using suitable data structures (e.g., list or matrix type data structures). Information describing any aspect of a stored social graph can be considered relationship data. For example, relationship data can include information describing how particular members of a user's social graph are connected to the user (e.g., through what social path is a particular entity connected to the user). Relationship data can also include information describing any relevant social signals incorporated in the user's social graph. In some implementations, relationship data can be stored in a relationship lookup table (e.g., a hash table). Suitable keys for locating values (e.g., relationship data) within the lookup table can include information describing the respective identities of both a user and any member of the user's social graph. For example, a suitable key for locating relationship data within the lookup table can be (User X, User Y), where User Y is a member of User X's social graph. In some implementations, the relationship lookup table can be accessed by a search system to rank search results or to generate annotations describing retrieved search results. For example, the lookup table can include text snippets describing respective social paths between a user and one or more members of the user's social graph.

As discussed above, one or more query auto-completions can be provided in response to an initial input provided by a searching user. Each of the one or more query auto-completions can include an associated ranking score (RS). In some implementations, the ranking score can be provided based on a frequency (f), an interaction score (IS), an endorsement score (ES) and/or a selection score (SS) (e.g., RS=f[f, IS, ES, and/or SS]). In some examples, a pre-determined score (S) associated with a query auto-completion can be received and can be modified based on the frequency (f), the interaction score (IS), the endorsement score (ES) and/or the selection score (SS) to provide the associated ranking score (e.g., RS=f[S, f, IS, ES, and/or SS]).

In some examples, the frequency reflects the frequency at which the query auto-completion is used as a search query. In some examples, the interaction score reflects user interaction with search results that had been previously generated based on the query auto-completion. In some examples, the endorsement score reflects endorsements users have provided to search results that are responsive to the query auto-completion. In some examples, the selection score reflects selections of the query auto-completion as a search query from a list of query auto-completions. In some examples, and as discussed in further detail below, each of the frequency, the interaction score, the endorsement score and the selection score can be provided based on the social graph of the searching user.

In some examples, respective weights can be applied to scores that are used to determine the ranking score for a given query auto-completion. By way of example, a ranking score of a query auto-completion can be determined based on the frequency, the interaction score, the endorsement score and the selection score associated with the query auto-completion. Respective weights can be applied to each of the frequency, the interaction score, the endorsement score and the selection score. In this manner, an influence of each of the frequency, the interaction score, the endorsement score and the selection score on the ranking score can be controlled based on relative importance. For example, the endorsement score can be considered to be more reflective of relevance of the query auto-completion than the frequency. Consequently, the endorsement score can be weighted more heavily than the frequency, such that the endorsement score has a more significant influence on the ranking score than does the frequency.

In some examples, the ranking score can be provided at least partially based on the frequency (e.g., RS=f[f, . . . ]). In some examples, the frequency of a query auto-completion can be determined based on the number of times the query auto-completion is submitted as a search query over a given time period. By way of example, a query auto-completion can have been submitted as a search query X times over the last Y days. Consequently, the frequency associated with the query auto-completion can be provided as the ratio of X to Y (e.g., f=X/Y). In some examples, the frequency of a query auto-completion can be determined based on the number of times the query auto-completion is submitted as a search query by members of the searching user's social graph over a given time period. By way of example, a query auto-completion can have been submitted as a search query X times over the last Y days, and Z times by members of the searching user's social graph. Consequently, the frequency associated with the query auto-completion can be provided as the ratio of Z to Y (e.g., f=Z/Y).

In some implementations, the frequency can be determined based on a location of members in the user's social graph. By way of example, a first query auto-completion can have been submitted as a search query X times over the last Y days, and Z times by members of the searching user's social graph, and a second query auto-completion can have been submitted as a search query X times over the last Y days, and W times by members of the searching user's social graph. Z and W can each account for the number of times direct contacts and indirect contacts (e.g., contacts of contacts) respectively submitted the first and second query auto-completions as search queries. Continuing with the example, Z can be provided as the sum of R direct contacts and S indirect contacts that submitted the first query auto-completion as a search query, and W can be provided as the sum of T direct contacts and U indirect contacts that submitted the first query auto-completion as a search query. In some examples, R is greater than T. Consequently, a first frequency associated with the first query auto-completion can be greater than a second frequency associated with the second query auto-completion (e.g., because more direct contacts submitted the first query auto-completion as a search query than submitted the second query auto-completion as a search query).

In some implementations, the ranking score can be provided based on user interaction with search results generated based on the query auto-completion. In some examples, the ranking score can be provided at least partially based on the interaction score (e.g., RS=f[IS, . . . ]). In some examples, the interaction score reflects user interaction with search results that had been previously generated based on the query auto-completion when the query auto-completion was selected as a search query. In some examples, the interaction score can range between a minimum value (e.g., 0) and a maximum value (e.g., 1), where the minimum value reflects minimum user interaction and the maximum values reflects significant user interaction with search results. In some examples, the interaction score can be provided as a composite score (e.g., an average score) reflecting user interaction across all previous users that had submitted the query auto-completion as a search query. In some examples, the interaction score can be provided as a composite score (e.g., an average score) reflecting user interaction across all previous users that had submitted the query auto-completion as a search query and that are members of the searching users social graph.

With continued reference to the interaction score, and by way of example, a first query auto-completion has been submitted as a first search query and first search results were generated based on the search query. In response to the first search results, minimal user interaction is seen (e.g., searching users tended not to scroll through the search results and/or select search results). Consequently, a first interaction score associated with the first query auto-completion can be equal to the minimum value. Continuing with the example, a second query auto-completion has been submitted as a second search query and second search results were generated based on the search query. In response to the second search results, significant user interaction is seen (e.g., searching users often scrolled through the search results and/or selected one or search results). Consequently, a second interaction score associated with the second query auto-completion can be equal to the maximum value.

In some examples, the ranking score can be provided at least partially based on the endorsement score (e.g., RS=f [ES, . . . ]). In some examples, the endorsement score of a query auto-completion can be determined based on the number of endorsements to resources that are provided in search results based on the query auto-completion. As used herein, the term endorsement can include one or more references that a user makes to online content. In some examples, the online content can include and/or can be associated with web documents, entities, interests, people, places, things, electronic messages, images and/or any other type of content. In some examples, a user can like a document (and/or the content therein) and can associate a positive reference with the document.

In some examples, an endorsement can be explicit. For example, a resource can include an endorsement button associated therewith. When a user selects (e.g., clicks on) the endorsement button, it can be explicitly noted that the particular user endorses the resource.

In some examples, an endorsement can be implicit. For example, a resource (e.g., a website, a web page and/or other web documents) and/or content within a web resource can be endorsed by reference. In some examples, a user can endorse a web page by embedding a link pointing to the web page with content authored by the user. In some examples, a user can endorse content provided within a web page by embedding a link pointing to the web page in content authored by the user.

By way of example, content generated by an author user can be generated within the context of a computer-implemented service (e.g., a blogging service, a micro-blogging service, product reviews, posts within a social networking service). For example, an author user can endorse a book by generating the example content "Great read: http://examplebook.com" within content generated by the user in a computer-implemented service. For example, the author user can generate a micro-blog post that includes the example content using a micro-blogging service. As another example, the author user can generate a post that includes the example content using a social networking service.

In the example content "Great read: http://examplebook.com," the destination web page of the link embedded in the content can be considered to be "publicly endorsed" by the author user. The content in this example provides a positive sentiment concerning the endorsed content (e.g., a recommendation to read the particular book identified by following the link).

In some implementations, the endorsement score associated with a particular query auto-completion can be based on the number of endorsements associated with search results that would be displayed if the particular query auto-completion is selected as a search query. By way of example, a query auto-completion can be associated with a set of search results. The set of search results can include the search results that would be displayed to the searching user, if the query auto-completion is selected as a search query. The set of search results can be analyzed to determine a number of endorsements associated therewith. For example, one or more search results of the set of search results can be associated with a plurality of endorsements. The number of endorsements over the set of search results can be summed and can be used to determine the endorsement score (e.g., the endorsement score is set equal to the number of endorsements). In some examples, only explicit endorsements are accounted for in the number of endorsements. In some examples, only implicit endorsements are accounted for in the number of endorsements. In some examples, explicit endorsements and implicit endorsements are both accounted for in the number of endorsements. In some implementations, only endorsements that are provided by members of the social graph of the searching user are accounted for in the number of endorsements.

In some examples, the ranking score can be provided at least partially based on the selection score (e.g., RS=f[SS, . . . ]). In some examples, the selection score of a query auto-completion can be determined based selections of the query auto-completion from a list of query auto-completions. By way of example, a query auto-completion can be displayed less prominently (e.g., lower) in a list of query auto-completions, but is often selected by searching users instead of the more prominently (e.g., higher) displayed query auto-completions. Consequently, a selection score associated with the query auto-completion can be increased reflecting user preference for the query auto-completion over more highly ranked query auto-completions. In some examples, selection scores associated with the more highly ranked query auto-completions can be decreased. In some implementations, only selections that are from members of the searching user's social graph are used to determine the selections score.

As discussed herein, each ranking score can be determined based on one or more of the frequency, the interaction score, the endorsement score and the selection score. As also discussed herein, each of the frequency, the interaction score, the endorsement score and the selection score can be provided based on the social graph of the searching user. In this manner, each ranking score is specific to the particular searching user.

By way of example, a first searching user inputs the initial input "safari" to a search box of a searching service. In response to the initial input, a set of query auto-completions can be identified. A first set of ranking scores can be determined, each ranking score of the first set of ranking scores being associated with a query auto-completion of the set of query auto-completions, and being based on the social graph of the first searching user. Consequently, the ranking scores of the first set of ranking scores are specific to the first searching user. A first list of query auto-completions can be displayed to the first searching user and can reflect a first rank order of the query auto-completions based on the ranking scores of the first set of ranking scores. A second searching user inputs the initial input "safari" to a search box of a searching service. In response to the initial input, the set of query auto-completions is identified. A second set of ranking scores can be determined, each ranking score of the second set of ranking scores being associated with a query auto-completion of the set of query auto-completions, and being based on the social graph of the second searching user. Consequently, the ranking scores of the second set of ranking scores are specific to the second searching user. A second list of query auto-completions can be displayed to the first searching user and can reflect a second rank order of the query auto-completions based on the ranking scores of the second set of ranking scores. The first rank order can be different from the second rank order. Consequently, the query auto-completions displayed to the first searching user can be provided in a different order than the query auto-completions provided to the second searching user.

Figure 2:
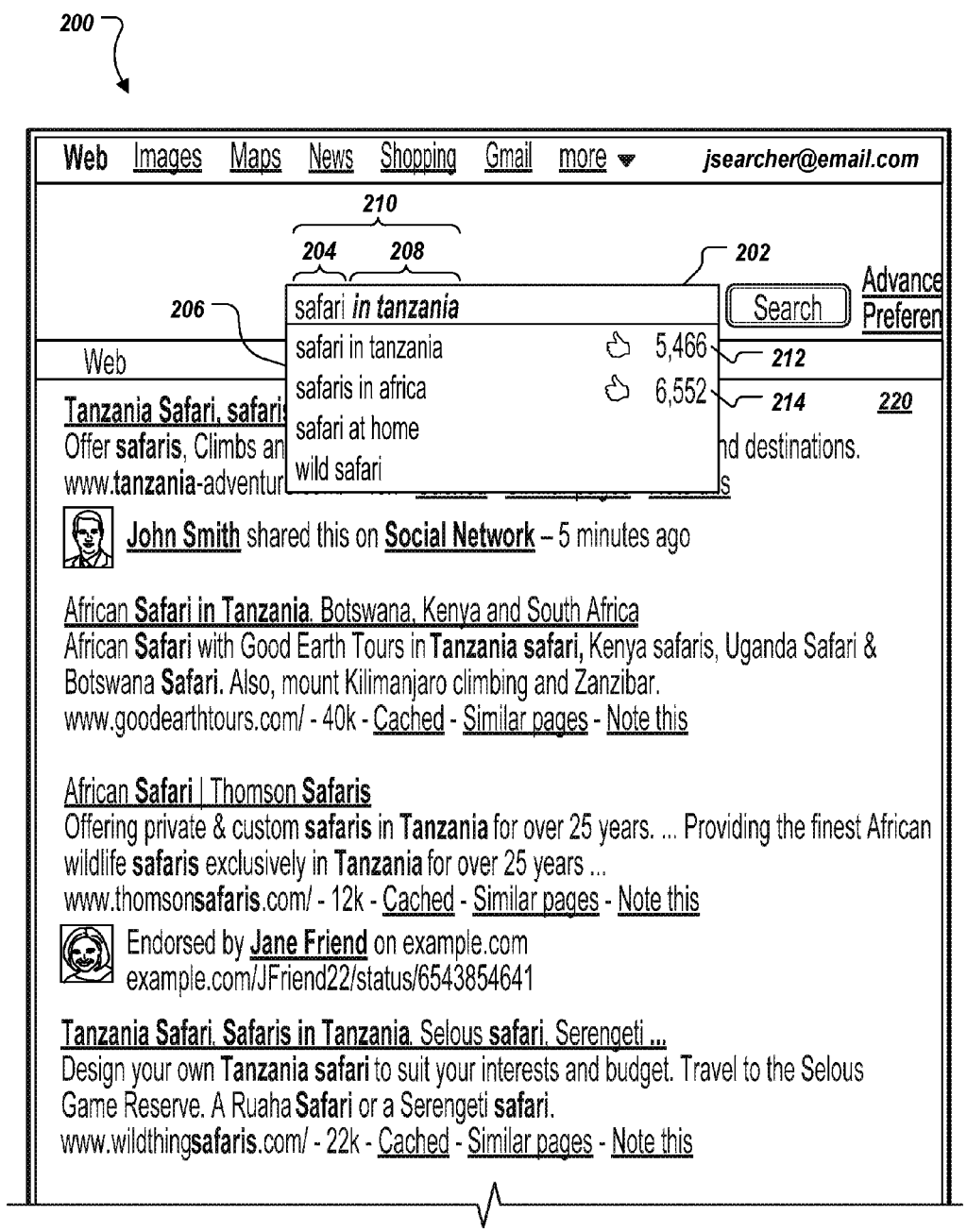
FIG. 2 is a representation of an example search results page including example query auto-completions.

FIG. 2 is a representation of an example search results page 200 that includes query auto-completions that are displayed based on a searching user's social graph. The search results page 200 is depicted as an example search results page of an example search service. The search results page 200 includes a search box 202 into which a searching user can input search terms. In the depicted example, the searching user is logged into the search service and has entered an initial input 204 into the search box 202. The word "safari" is provided as the example initial input 202. The initial input 202 and an identifier (ID) associated with the searching user (e.g., jsearcher@email.com), and/or a cookie associated with a computing device of the searching user can be provided to a search system (e.g., the search system 130 of FIG. 1). As discussed in further detail herein, the initial input 202 can be processed to identify a plurality of query auto-completions and a social graph of the user can be processed to provide a list of one or more query auto-completions from the plurality of query auto-completions.

In some implementations, the initial input can be processed by a query auto-completion engine (e.g., the query auto-completion engine 132 of FIG. 1) to identify a plurality of query auto-completions that might be relevant to the initial input. In some examples, the initial input is provided as input to a database of query auto-completions (e.g., the query auto-completions index 136 of FIG. 1) and query auto-completions that are determined to be relevant to the initial input are retrieved. In response to the example initial input "safari," example query auto-completions can include "safaris in africa," "safari in tanzania," "safari at home," and "wild safari." For example, the query auto-completion "safaris in africa" includes the initial input "safari" and the completion "s in africa," the query auto-completion "safari in tanzania" includes the initial input "safari" and the completion "in tanzania," the query auto-completion "safari at home" includes the initial input "safari" and the completion "at home," and the query auto-completion "wild safari" can be provided as a matching query auto-completion based on the initial input "safari."

In some implementations, information regarding the social graph of the searching user can be accessed by the query auto-completion engine (e.g., the query auto-completion engine 132 can retrieve social graph information from the social index 138). More particularly, the query auto-completion engine can retrieve social graph information that can be associated with each of the query auto-completions. Example social graph information can include the number of times members of the social graph of the searching user have previously entered one or more of the query auto-completions as search queries, have previously selected one or more of the query auto-completions as search queries from a list of query auto-completions, have endorsed one or more resources that would be provided as search results with respect to the query auto-completions, and have interacted with search results that would be provided with respect to the query auto-completions.

In some implementations, the query auto-completion engine can process the social graph information to generate ranking scores, each ranking score being associated with a query auto-completion. In the depicted example, a first ranking score (RS1) can be determined and can be associated with the query auto-completion "safaris in africa," a second ranking score (RS2) can be determined and can be associated with the query auto-completion "safari in tanzania," a third ranking score (RS3) can be determined and can be associated with the query auto-completion "safari at home," and a fourth ranking score (RS4) can be determined and can be associated with the query auto-completion "wild safari." In the depicted example, the second ranking score is greater than the first ranking score, the first ranking score is greater than the third ranking score, and the third ranking score is greater than the fourth ranking score. Consequently, the query auto-completion engine generates a list of query auto-completions in the following order "safari in tanzania," "safaris in africa," "safari at home," and "wild safari."

In some implementations, the query auto-completion engine provides the list of query auto-completions for display to the searching user and to a search engine 134. For example, the list of query auto-completions and data associated with one or more of the query auto-completions can be provided to a client computing device of the searching user for display to the user. In the example of FIG. 2, a dropdown menu 206 is displayed below the search box 202 and is populated with the query auto-completions in the rank order determined by the query auto-completion engine. In the depicted example, the query auto-completion "safari in tanzania" is provided as the highest ranking query auto-completion. In some implementations, the highest ranking query auto-completion populates the search box 202 and includes a completion 208. In the depicted example, the initial input 204 is provided in a different font, format, color and/or size than the completion 208. The initial input 204 and the completion 208 make up a potential search query 210.

In some implementations, ancillary information can be displayed in the dropdown menu 206. In the depicted example, endorsement counts 212, 214 are displayed relative to the query auto-completions "safari in tanzania" and "safari in africa," respectively. The endorsement counts can be provided in the data associated with one or more of the query auto-completions. The endorsement counts 212, 214 reflect the number of endorsements associated with search results that would be displayed, if the respective query auto-completion is selected as a search query. In some examples, the endorsement counts 212, 214 reflect all endorsements. In some examples, the endorsement counts 212, 214 only reflect endorsements provided by members of the social graph of the searching user.

In some implementations, the searching user can interact with the endorsement counts 212, 214 to display more detailed information. In some examples, the searching user can use a cursor to click on, or hover over an endorsement count. In response to the user interaction, a dialogue box can be displayed and can display information associated with one or more members of the social graph of the searching user that provided one or more endorsements. In some examples, a thumbnail image of each of the one or more members can be displayed and/or a link to a profile of each of the one or more members within a computer-implemented service (e.g., a social networking service) can be displayed.

In some implementations, the highest ranking query auto-completion is provided to the search engine and preliminary search results are generated based on the query auto-completion. For example, the search engine (e.g., the search engine 134 of FIG. 1) can access a resource index (e.g., the resource index 140 of FIG. 1) to identify one or more search results relevant to the query auto-completion. The one or more search results can be provided for display to the user. In the depicted example, preliminary search results 220 are identified based on the query auto-completion "safari in tanzania" and are displayed to the user. If the user selects the query auto-completion "safari in tanzania" as the search query (e.g., clicks on "safari in tanzania" in the dropdown menu 206), the preliminary search results 220 can be provided as final search results. If, however, the user selects another query auto-completion (e.g., clicks on "safari at home" in the dropdown menu 206), the preliminary search results 220 are replaced with search results that correspond to the selected query auto-completion.

In some implementations, the search results are not displayed until after the searching user has selected a query auto-completion. For example, in response to the searching user selecting the query auto-completion, a search query is submitted, search results responsive to the search query are received and are displayed to the searching user.

Figure 3:
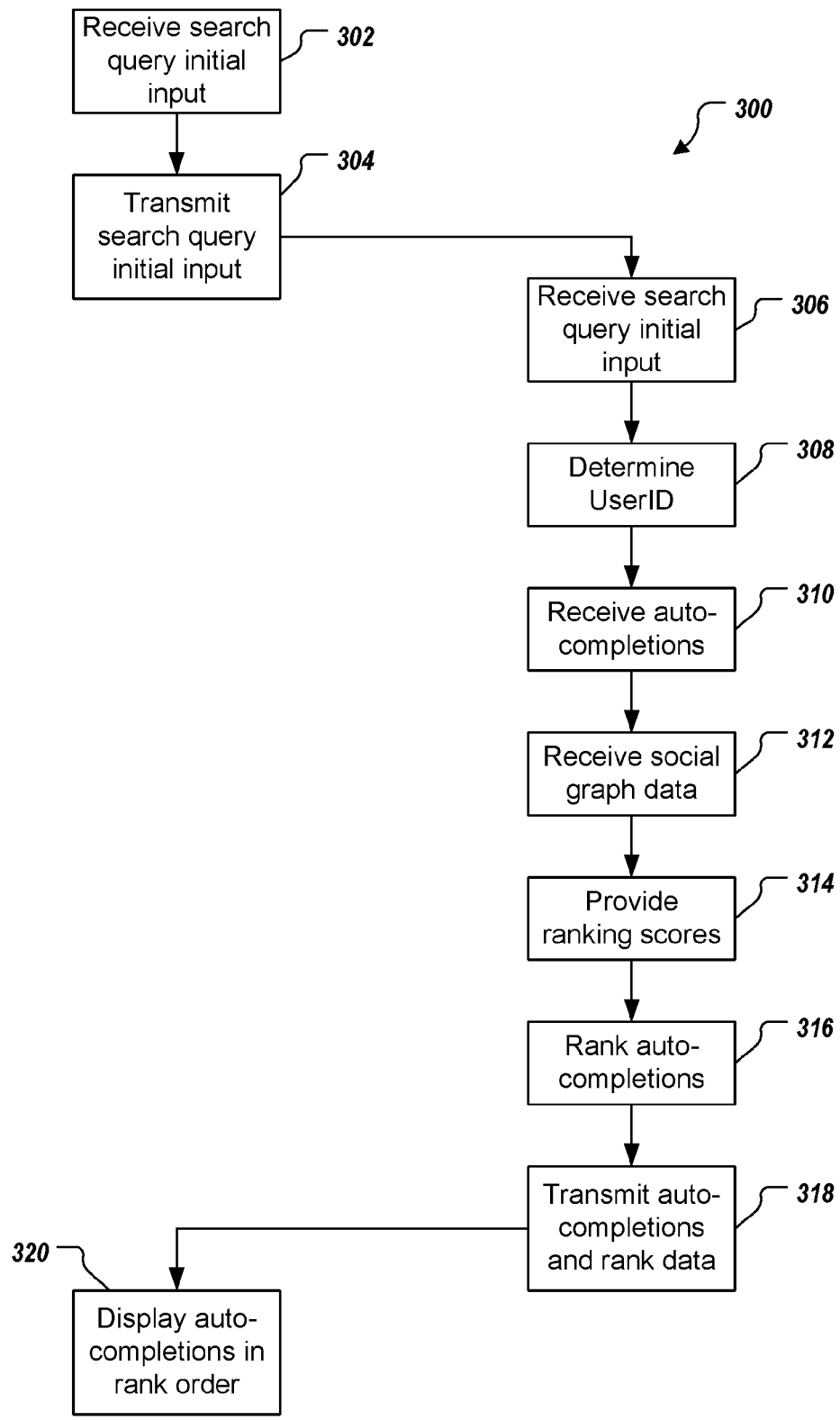
FIG. 3 is a flow diagram of an example process that can be executed in implementations of the present disclosure.

FIG. 3 is a flow diagram of an example process 300 that can be executed in implementations of the present disclosure. The example process 300 can be implemented in one or more software programs executed using one or more computing devices (e.g., at least one of client devices 102-110 and/or the server system 112 of FIG. 1).

A search query initial input is received (302). For example, a user of a client computing device enters the initial input into a search box of a web page of a search service. The search query initial input is transmitted (304). For example, the client computing device transmits the initial input to a search system provided on a server computing device. The search query initial input is received (306). For example, the search system receives the initial input.

An identification (UserID) is determined (308). For example, the UserID identifies the searching user that provided the search query initial input. In some examples, the UserID is determined based on the searching user having logged into the search service. Query auto-completions are received (310). For example, a query auto-completion engine can provide the initial input to a query auto-completions database and, in response, can receive query auto-completions that might be relevant to the initial input. Social graph data is received (312). For example, the query auto-completion engine can provide the UserID to a social database and, in response, can receive social graph data related to the particular searching user.

Ranking scores are provided (314). For example, the query auto-completion engine can determine a user-specific ranking score for each query auto-completion based, at least in part, on the social graph data. In some examples, scores associated with respective query auto-completions can be received and can be modified based on the social graph data to provide the user-specific ranking scores. The query auto-completions are ranked (316). For example, the query auto-completion engine can determine a rank order of the query auto-completions based on the ranking scores. The query auto-completions and rank data are transmitted (318). For example, the server computing device can transmit the query auto-completions and rank data to the client computing device that had provided the initial input. The query auto-completions are displayed in rank order (320). For example, a web browser executing on the client computing device processes the query auto-completions and rank data to display the query auto-completions in the rank order on the web page.

Implementations of the present disclosure and all of the functional operations described in this specification can be implemented in digital electronic circuitry, or in computer software, firmware, or hardware, including the structures disclosed in this specification and their structural equivalents, or in combinations of one or more of them. Embodiments of the present disclosure can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the present disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the present disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as descriptions of features specific to particular embodiments of the present disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the present disclosure have been described. Other embodiments are within the scope of the following claims. For example, the actions recited in the claims can be performed in a different order and still achieve desirable results.

What is claimed is:

1. A method comprising:
    receiving, by a system of one or more computers of a search service, an initial search query from a user device of a user;
    receiving, by the system, a plurality of query auto-completions based on the initial search query;
    receiving, by the system, social graph data that is specific to the user, wherein the social graph data represents a respective computer-based social relationship of the user with each of one or more other users of the search service;
    determining, by the system, a ranking score for each query auto-completion of the plurality of query auto-completions based at least in part on the social graph data, wherein the ranking score for each auto-completion is based at least in part on an endorsement score for the query auto-completion, and wherein the endorsement score reflects endorsements provided by other users to search results that had been previously generated based on the query auto-completion; and
    transmitting, by the system, to the user device, a response to the initial search query, the response including multiple query auto-completions in an order that is determined based on ranking scores.

2. The method of claim 1, wherein:
    the endorsement score is determined based on the social graph data.

3. The method of claim 1, further comprising:
    transmitting with the response ancillary data and instructions to display the ancillary data with the multiple query auto-completions, wherein the ancillary data includes one or more endorsement counts, each endorsement count being specific to a respective query auto-completion.

4. The method of claim 1, wherein:
    the endorsement score for each query auto-completion determined based on the number of endorsements that are associated with search results that would be displayed, if the query auto-completion is selected as a search query.

5. The method of claim 4, where the number of endorsements reflects all endorsements.

6. The method of claim 4, wherein the number of endorsements reflects only reflect endorsements provided by members of the social graph of the searching user.

7. The method of claim 4, wherein the number of endorsements includes both implicit and explicit endorsements.

8. The method of claim 4, wherein the number of endorsements includes explicit endorsements but not implicit endorsements.

9. The method of claim 4, further comprising:
    transmitting in the response a respective endorsement count for each of multiple query auto-completions and a link for each endorsement count that the user can select to display more detailed information about the endorsements underlying the endorsement count.

10. The method of claim 9, wherein the detailed information about the endorsements underlying the endorsement count comprises information associated with one or more members of the social graph of the user who provided one or more of the endorsements.

11. A system, comprising:
    one or more computers and one or more storage devices of a search service on which are stored instructions that are operable, when executed by the one or more computers, to cause the one or more computers to perform operations comprising:
    receiving an initial search query from a user device of a user;
    receiving a plurality of query auto-completions based on the initial search query;
    receiving social graph data that is specific to the user, wherein the social graph data represents a respective computer-based social relationship of the user with each of one or more other users of the search service;
    determining a ranking score for each query auto-completion of the plurality of query auto-completions based at least in part on the social graph data, wherein the ranking score for each auto-completion is based at least in part on an endorsement score for the query auto-completion, and wherein the endorsement score reflects endorsements provided by users to search results that had been previously generated based on the query auto-completion; and
    transmitting to the user device, a response to the initial search query, the response including multiple query auto-completions in an order that is determined based on ranking scores.

12. The system of claim 11, further comprising:
    a query auto-completion index that provides a body of queries that can be accessed based on an identifier associated with a searching user and a social graph associated with the searching user.

13. The system of claim 11, wherein:
    the endorsement score is determined based on the social graph data.

14. The system of claim 11, wherein the operations comprise:
transmitting with the response ancillary data and instructions to display the ancillary data with the multiple query auto-completions, wherein the ancillary data includes one or more endorsement counts, each endorsement count being specific to a respective query auto-completion.

15. The system of claim 11, wherein:
the endorsement score for each query auto-completion determined based on the number of endorsements that are associated with search results that would be displayed, if the query auto-completion is selected as a search query.

16. The system of claim 15, where the number of endorsements reflects all endorsements.

17. The system of claim 15, wherein the number of endorsements reflects only reflect endorsements provided by members of the social graph of the searching user.

18. The system of claim 15, wherein the number of endorsements includes both implicit and explicit endorsements.

19. The system of claim 15, wherein the number of endorsements includes explicit endorsements but not implicit endorsements.

20. The system of claim 15, wherein the operations comprise:
transmitting in the response a respective endorsement count for each of multiple query auto-completions and a link for each endorsement count that the user can select to display more detailed information about the endorsements underlying the endorsement count.

21. The system of claim 20, wherein the detailed information about the endorsements underlying the endorsement count comprises information associated with one or more members of the social graph of the user who provided one or more of the endorsements.

22. A computer storage medium encoded with a computer program, the program comprising instructions that when executed by one or more computers cause the one or more computers to perform operations of a search service comprising:
receiving an initial search query from a user device of a user;
receiving a plurality of query auto-completions based on the initial search query;
receiving social graph data that is specific to the user, wherein the social graph data represents a respective computer-based social relationship of the user with each of one or more other users of the search service;
determining a ranking score for each query auto-completion of the plurality of query auto-completions based at least in part on the social graph data, wherein the ranking score for each auto-completion is based at least in part on an endorsement score for the query auto-completion, and wherein the endorsement score reflects endorsements provided by users to search results that had been previously generated based on the query auto-completion; and
transmitting to the user device, a response to the initial search query, the response including multiple query auto-completions in an order that is determined based on ranking scores.

* * * * *